July 2, 1957
L. M. BUTTERFIELD
2,797,807
MACHINE FOR GRADING ARTICLES BY WEIGHT
Filed Jan. 30, 1956
4 Sheets-Sheet 1
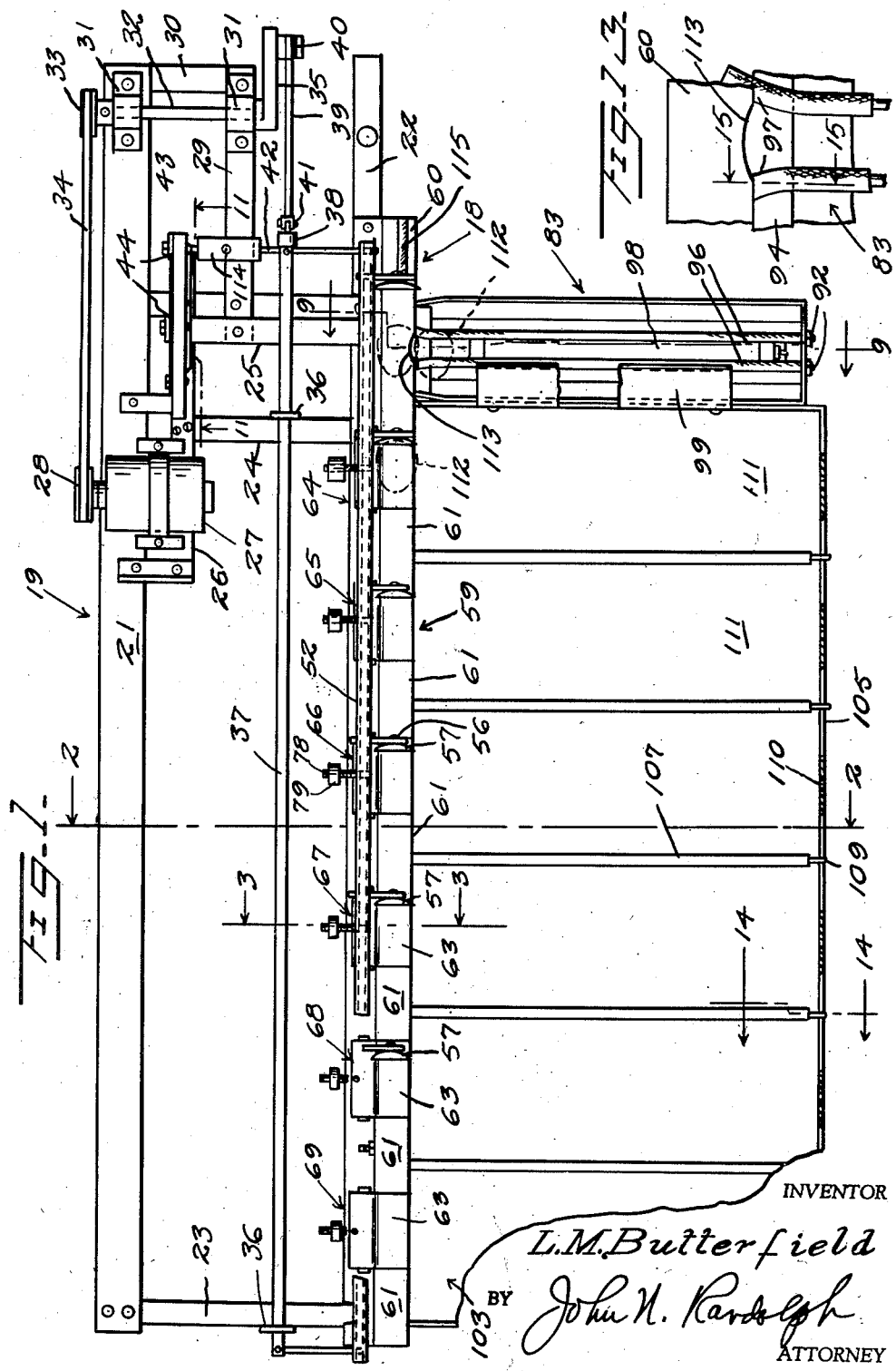
INVENTOR
L. M. Butterfield
BY
ATTORNEY

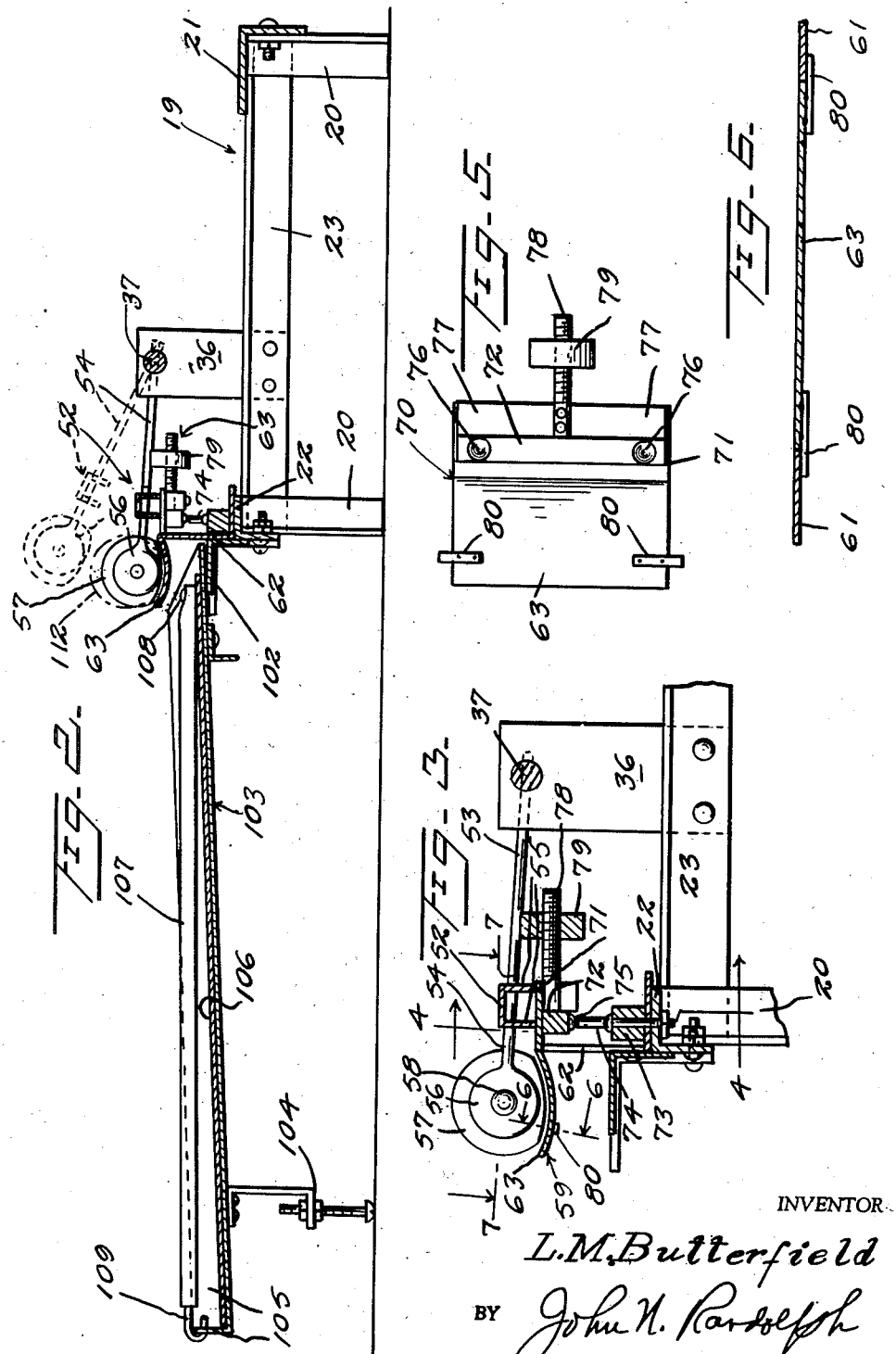

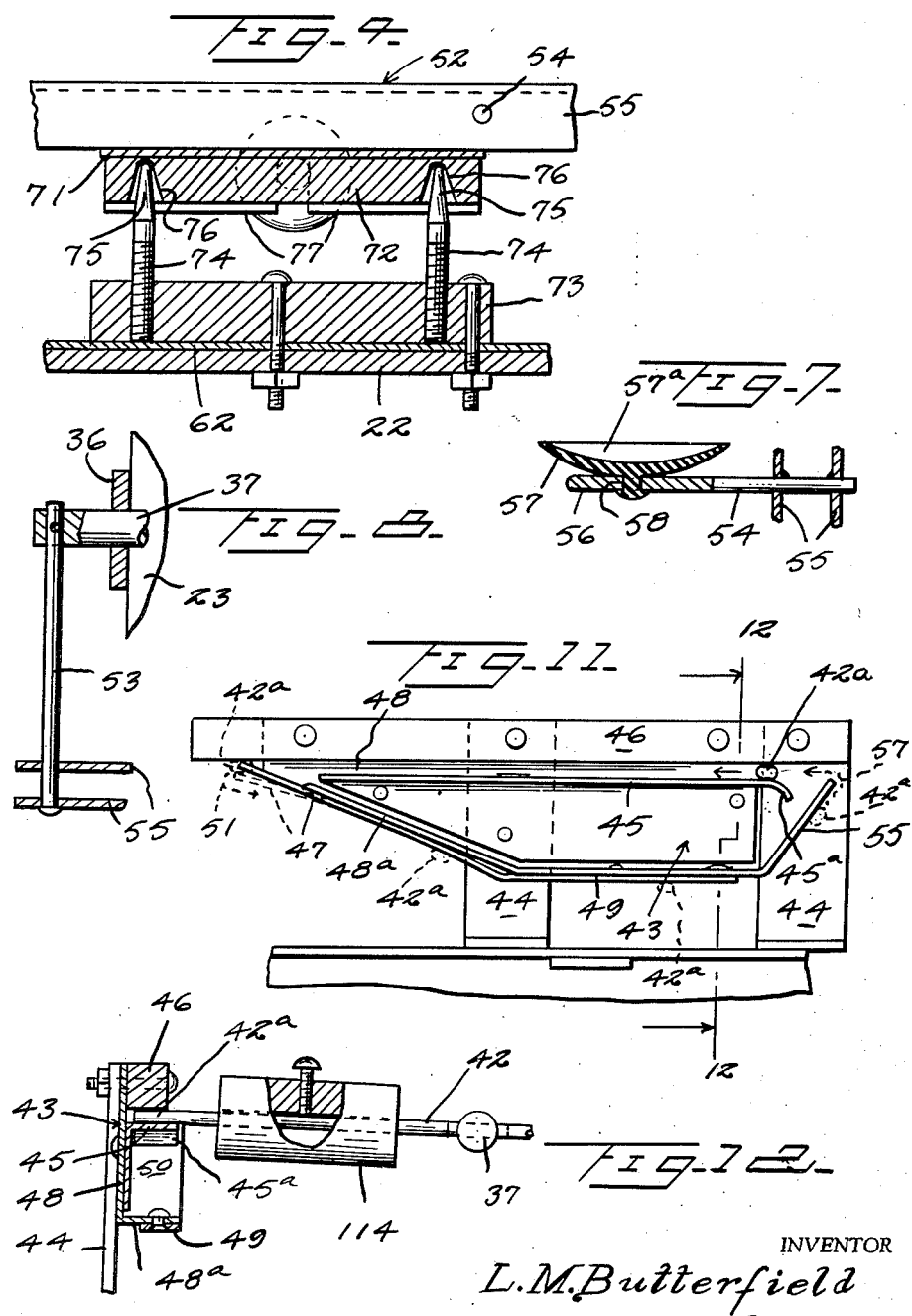

July 2, 1957 L. M. BUTTERFIELD 2,797,807
MACHINE FOR GRADING ARTICLES BY WEIGHT
Filed Jan. 30, 1956 4 Sheets-Sheet 4
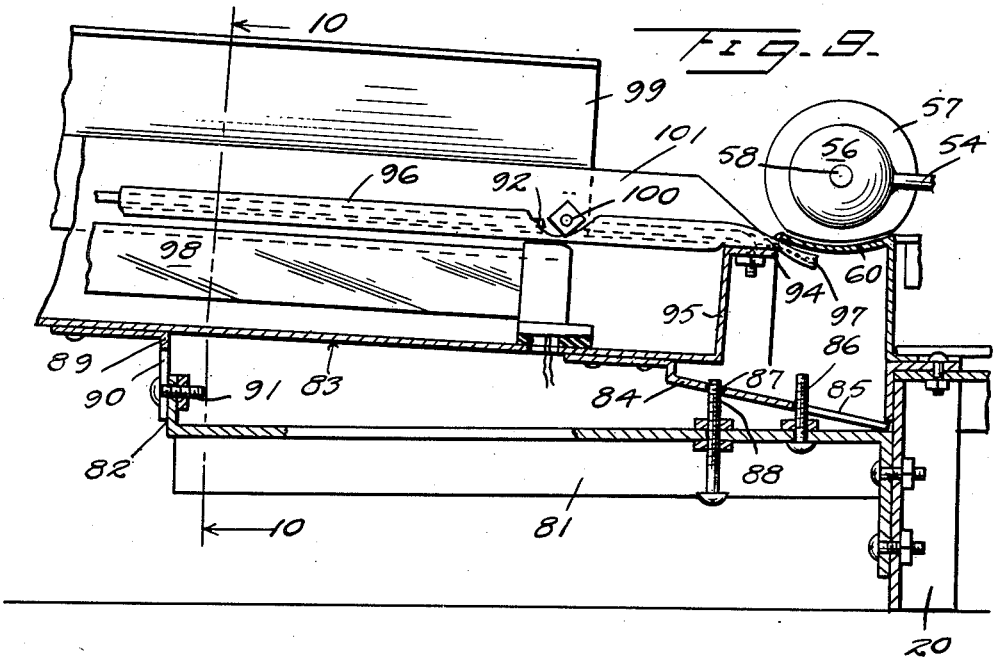
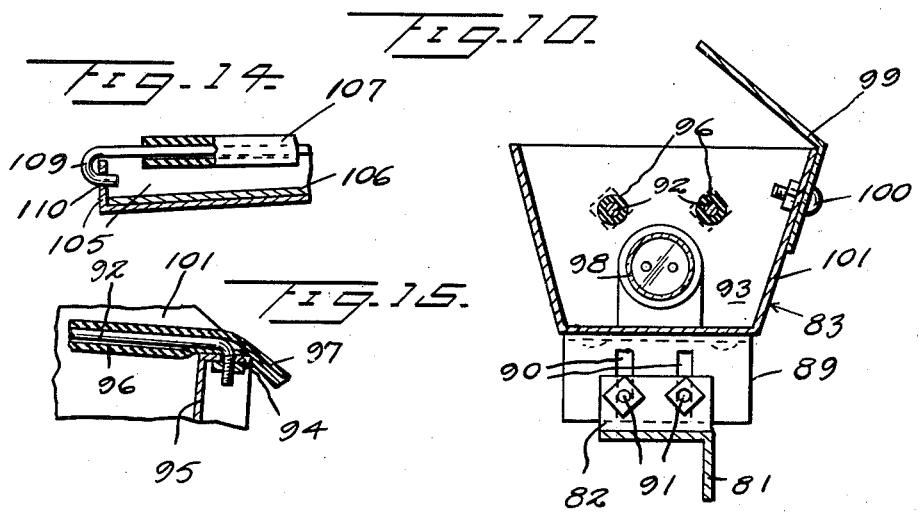
INVENTOR
L. M. Butterfield
BY John N. Randolph
ATTORNEY United States Patent Office 2,797,807
Patented July 2, 1957

2,797,807

MACHINE FOR GRADING ARTICLES BY WEIGHT

Louis M. Butterfield, Kittery, Maine

Application January 30, 1956, Serial No. 562,181

10 Claims. (Cl. 209—121)

This invention relates to a novel machine of relatively simple construction by means of which articles can be accurately graded by weight and automatically separated according to weight.

More particularly, it is an aim of the present invention to provide a machine along which the articles to be graded will be moved by a rolling and/or sliding motion and will be intermittently pushed along a track onto successive weighing stations which are differently adjusted for sorting the articles by weight.

A further object of the invention is to provide a grading machine through the use of which a very gentle handling of the articles is accomplished thereby making the machine readily adaptable for use in grading fragile articles such as eggs.

Still another object of the invention is to provide a machine wherein the articles are not gripped but rather are conveyed by a pushing action, enabling the machine to be utilized for articles of various sizes without modification of the machine.

Still another object of the invention is to provide a machine including a track along which the articles to be graded are pushed in a step by step movement onto successive spaced scale pans, forming parts of the weighing stations, and which constitute the dwell positions in the travel of the articles along the track and from which weighing stations the articles are discharged by gravity for sorting the articles by weight.

Still another object of the invention is to provide a grading machine wherein individual scale pans are tiltable under the weight of the articles for discharge of the articles therefrom and by which the tilting of the pans toward discharging positions is controlled.

Still a further object of the invention is to provide a machine including novel means for maintaining the scale pans in coplanar positions with the remainder of the track during advance of the articles along the track.

Another object of the invention is to provide a novel means of extremely simple construction for actuating and controlling the movement of the article propelling unit.

Various other objects and advantages of the invention will hereinafter become more fully apparent from the following description of the drawings, illustrating a presently preferred embodiment thereof, and wherein:

Figure 1 is a top plan view of the machine, partly broken away;

Figure 2 is an enlarged cross sectional view thereof, taken substantially along a plane as indicated by the line 2—2 of Figure 1;

Figure 3 is an enlarged fragmentary cross sectional view, taken substantially along a plane as indicated by the line 3—3 of Figure 1;

Figure 4 is an enlarged fragmentary longitudinal sectional view, taken substantially along a plane as indicated by the line 4—4 of Figure 3;

Figure 5 is a bottom plan view of one of the weighing devices or scales removed from the machine;

Figure 6 is a fragmentary longitudinal sectional view of a portion of the track, taken substantially along a plane as indicated by the line 6—6 of Figure 3;

Figure 7 is an enlarged detailed horizontal sectional view, taken substantially along a plane as indicated by the line 7—7 of Figure 3;

Figure 8 is a fragmentary plan view partly in horizontal section of an end portion of the machine;

Figure 9 is an enlarged fragmentary cross sectional view, taken substantially along a plane as indicated by the line 9—9 of Figure 1;

Figure 10 is a cross sectional view of a portion of the machine, taken substantially along a plane as indicated by the line 10—10 of Figure 9;

Figure 11 is an enlarged fragmentary vertical sectional view taken substantially along a plane as indicated by the line 11—11 of Figure 1;

Figure 12 is a fragmentary transverse sectional view taken substantially along a plane as indicated by the line 12—12 of Figure 11;

Figure 13 is a detailed plan view of a portion of the machine;

Figure 14 is an enlarged fragmentary transverse sectional view, taken substantially along a plane as indicated by the line 14—14 of Figure 1, and Figure 15 is an enlarged fragmentary detailed sectional view, taken substantially along a plane as indicated by the line 15—15 of Figure 13.

Referring more specifically to the drawings, the grading machine in its entirety and comprising the invention is designated generally 18 and includes an elongated substantially rectangular frame, designated generally 19, most of the parts of which are preferably formed of angle iron, and which frame is supported in an elevated position by a plurality of depending supporting legs 20, which are likewise preferably formed of angle iron. The frame 19 includes longitudinal side members 21 and 22, an end member 23, which is located at one end of the frame, and cross braces 24 and 25 which are located near to but spaced from the other frame end. A motor supporting bracket 26 is secured to and extends inwardly from the outer side frame member 21 and is additionally supported partially by the cross brace 24, which is located between the end cross brace 23 and the cross brace 25. A motor 27 is mounted on and supported by the bracket 26 and a portion of the member 21, crosswise of the frame 19, and has a drive pulley 28 located outwardly with respect to the frame side 21. A longitudinal supporting brace 29 has an inner end secured to the cross brace 25 and an outer end secured to an arm 30 which extends inwardly from the end of the frame member 21, located remote from the end cross brace 23. Aligned bearings 31 are mounted on and secured to the members 21 and 29 for journalling a shaft 32. A pulley 33 is connected to one end of the shaft 32 and an endless belt 34 is trained over the pulleys 28 and 33 for driving the shaft 32 from the motor 27. A crank 35 is fixed to the other inner end of the shaft 32 and is disposed for rotation between the brace 29 and an end of the longitudinal frame member 22.

Bearing and guide standards 36 are fixed to and rise from the frame members 23 and 24 for supporting a rod or shaft 37 which is mounted for reciprocating and oscillating movement therein. One end of the rod or shaft 37 terminates adjacent the crank 35 and has an element 38 swivelly attached thereto. A pitman 39 is pivotally connected at one end thereof to a pin 40 of the crank 35 and is pivotally connected by a joint 41 at its other end to the swivel element 38. A rod 42 is secured intermediate of its ends to the shaft 37, adjacent the swivel head 38, and is disposed substantially crosswise of said shaft.

A guide unit, designated generally 43, is mounted in a vertical plane, longitudinally of the machine 18, and is supported above the frame 19 by uprights 44 which are fixed to and rise from portions of said frame. Said guide unit has an open side facing toward the end portion of the shaft 37 to which the pitman is connected, as best seen in Figure 11. The guide 43 includes a substantially horizontally disposed top rail 45 which is disposed beneath and spaced from a top bar 46, as seen in Figures 11 and 12, said top rail having a downwardly curved rear end 45a. The guide 43 additionally includes a downwardly and rearwardly sloping front rail 47 comprising the free end of a leaf spring which is spring biased upwardly and inwardly, so that the upper end thereof normally bears against the underside of the top bar 46 and is spaced from the forward end of the top rail 45. The intermediate portion of the inclined front rail yieldably bears against a flange 48a which projects laterally from a backplate 48 of the guide 43 and which additionally provides a support for the top rail 45. The guide 43 includes a bottom rail 49 which constitutes a rearward extension of the lower rear end of the front rail 47 and which is disposed beneath and substantially parallel to the rear portion of the top rail 15. The bottom rail 49 may be formed by another portion of the flange 48a and by the other secured end of the leaf spring 47. The guide 43 also includes a rear rail 50, which may be formed by an extension of the flange 48a. The rail 50 extends upwardly and rearwardly at an incline from the rear end of the bottom rail 49 and is spaced rearwardly from the downturned rear end 45a of the top rail 45 and terminates beneath and spaced from the top bar 46 and at approximately the level of the upper side of the top rail 45, as seen in Figure 11. The rod 42 is provided with an end 42a which is disposed to travel around the guide rail, as illustrated in solid and broken lines in Figure 11, said end 42a preferably being flattened. The diameter of the circle described by the crank pin 40 is somewhat greater than the distance between the remote uppermost ends of the front rail 47 and rear rail 50, so that the rod end 42a may travel to beyond the remote ends of said rails and is correctly positioned for such travel which is accomplished in a counterclockwise direction of movement as indicated by the arrows 51 in Figure 11.

The other end of the rod 42 extends transversely through and supports one end of an elongated bar 52 which is of inverted channel shape in cross section, as best seen in Figure 3. The other end of the bar 52 is similarly supported by an end of a rod 53 which extends laterally from the end portion of the shaft 37, which is disposed remote from the pitman 39. The bar 52 at spaced intervals along its length supports a plurality of rods or arms 54, inner ends of which extend through and are anchored in the depending spaced substantially parallel walls 55 of said bar, in the same manner that ends of the rods 42 and 53 are secured to the bar 52. The arms or rods 54 have substantially vertically disposed enlarged flattened heads 56 at the outer sides thereof. Cushioning members 57 are secured to complementary sides of the heads 56, as by a connection consisting of a tit projecting from a rear side of the cushioning member 57 through an opening of the head 56. Such a connection 58 is illustrated in Figure 7. The cushioning members 57 are disposed on the side of the head 56 which face toward the end of the bar 52 supported by the rod 53, and said cushioning members have concave article engaging faces 57a, as seen in Figure 7.

A track, designated generally 59, is supported by the frame 19 and is disposed beneath the article propelling members 56, 57. Said track 59 is composed of a relatively long stationary track section 60, which is disposed substantially in transverse alignment with the guide 43, and a plurality of shorter stationary track sections 61 which are disposed in alignment with one another and with the track section 60 and in spaced apart relation to one another and to said section 60, as seen in Figure 1.

The track sections 60 and 61 are supported above and outwardly with respect to the inner side member 22 of the frame 19 by supporting legs 62 which extend downwardly from inner edges of said track sections and which are secured to said frame member 22. The track 59 also includes a plurality of movable track sections 63 which are interposed between the track section 61, and the track section 60 and the track section 61 located adjacent thereto. Said track sections 63 are normally disposed coplanar with the track sections 60 and 61, as best illustrated in Figure 6. The track sections 63 constitute portions of stations, designated generally 64, 65, 66, 67, 68 and 69, at which articles are graded or sorted by weight. Whereas six such grading stations have been disclosed, it will be understood that a greater or lesser number may be provided. The machine is provided with a total of six article propelling units 56, 57, corresponding to the number of the grading stations.

Each grading station comprises a weighing scale the track section 63 of which constitutes a front portion of a scale pan, designated generally 70, and which additionally includes a rear portion 71 to the underside of which is secured a bar 72, as best illustrated in Figures 3, 4 and 5. Elongated blocks 73 are secured to the upper side of the frame member 22 behind and in alignment with the grading stations. Each of said blocks 73 supports a pair of pins 74. The pins of all of the blocks 73 are disposed in alignment and have tapered upper ends 75 terminating in the same horizontal plane. The tapered pin ends 75 fit loosely in downwardly opening sockets 76 formed in the bar 72 and bear against the rounded upper or inner ends of said sockets, as seen in Figure 4, so that each scale pan 70 is supported by a pair of pins 74 for rocking movement in a vertical plane, so that the track sections 63 of said scale pans may swing downwardly and then upwardly relative to the track 59. Weighted blocks 77 are suitably secured to the underside of the rear pan portion 71 of each scale pan behind the bar 72 thereof for more than counterbalancing the weight of the forward portion 63 of said scale pan. A threaded rod 78 is secured to the underside of the rear pan portion 71, intermediate of the ends thereof, behind the bar 72 and between the weights 77, as best seen in Figure 5, and extends rearwardly from the back edge of the pan 70 to adjustably support a counterweight 79 which is threaded thereon. Strips 80 are secured to the underside of the forward pan portion 63 and have unsecured remote ends extending from the ends of said portion 63 and which form stops to engage under the adjacent ends of the two stationary track sections 61, between which the pan portion 63 is disposed, to prevent said pan portion or track section 63 from swinging upwardly above the plane of the track sections 61, as best illustrated in Figure 6. Additionally, and as clearly illustrated in Figure 3, when the propelling units 56, 57 are in lowered positions for propelling articles along the track 59, the bottom edges of the walls 55 rest on the upper surfaces of the rear portions 71 of the pans 70 above and behind the scale pivots 75 to prevent the track portions 63 from swinging downwardly from their fully elevated positions, and it will be apparent that any individual pan portion 63 can swing downwardly only by lifting the bar 52 and all of the pusher elements carried thereby.

The weights 79 of the different weighing scales are individually adjusted to balance the different weighing scales for articles of predetermined weights. Assuming that the machine is to be utilized for grading or sorting eggs by weight, the weighing scale of the station 64 would have the weight 79 thereof adjusted away from its pan 70 to the greatest extent so that the pan would be tilted to discharge an egg from the track section 63 thereof only if the egg exceeded a predetermined maximum weight. The weight 79 of the next station 65 would be adjusted so that the pan 70 thereof would discharge eggs of a slightly lesser weight and so on progressively to the station 69 where the weight 79 would be adjusted forwardly to an extent to permit the pan 70 thereof to discharge eggs of a minimum weight.

As best seen in Figure 9, a supporting arm, preferably formed of angle iron and designated 81, is secured to one of the legs 20 which is disposed beneath an intermediate portion of the end track section 60. The supporting arm 81 extends forwardly from said leg 20 and has an upturned opposite end 82. An elongated feed trough 83 is demountably supported by the arm 81 crosswise of the track section 60 and so as to extend forwardly therefrom. Said feed trough adjacent its forward end and on its underside is provided with a bracket element 84 which extends downwardly and forwardly therefrom to bear against the upper side of the inner end of the arm 81 and the leg 20 to which said arm is secured. Said bracket element 84 has a slot 85 opening outwardly of its forward end which engages a bolt 86 which extends upwardly from the arm 81. The bracket element 84 is also provided with an opening 87, behind the slot 85, to receive the upper end of another bolt 88 which extends upwardly from the arm 81. A second bracket element 89 is fixed to and extends downwardly from an intermediate portion of the bottom of the trough 83 and has spaced slots 90, which are spaced transversely relative to the longitudinal axis of the trough 83, and which engage bolts of bolt and nut fastenings 91 which extend through the upturned arm portion 82 and which can be tightened to clamp depending portions of the bracket 89 adjustably to the arm portion 82, so that the bottom of the trough 83 located directly above the arm portion 82 may be disposed at different levels with respect thereto, for varying the incline of the trough 83 downwardly and toward the track section 60. By loosening the fastenings 91, the trough 83 can be swung upwardly and to the right as seen in Figure 9, for readily removing it from the machine 18.

A pair of rods 92 are secured within and longitudinally of the trough 83 in transversely spaced apart relation to one another and are disposed substantially above the bottom of the trough 83. The rear ends of the rods 92 are secured to the rear wall 93 of the trough and the forward ends of said rods are secured to a lip 94 which projects forwardly from a front wall 95 of the trough, as clearly illustrated in Figures 9 and 15. The rods 92 are each enclosed in a rubber tube 96. The forward ends 97 of the tubes 96 are cut and flattened so as to extend beyond the forward ends of the rods 92 and to overlie the forward edge of the lip 94, as seen in Figures 9 and 15. The rods 92 are disposed substantially parallel to the bottom of the trough 83 so as to be inclined downwardly and toward the track section 60 and the upper portions of the tubes 96 are disposed slightly above the level of the track section 60, adjacent the forward ends of said rods.

An elongated light source 98, which may be connected to any suitable source of current, is suitably mounted in the lower portion of the trough 83 and longitudinally thereof and is disposed beneath and between the encased rods 92, as best seen in Figure 10. A shield 99 is detachably secured by fastenings 100 to the outer side of the trough wall 101 which is disposed remote from the end of the machine 18, adjacent to which said trough is mounted. Said shield 99 extends upwardly and inwardly over a portion of the open top of the trough 83 from said side wall 101.

As best seen in Figure 2, the front of the frame 19 is provided with an outwardly projecting supporting shelf or ledge 102 which is disposed below and spaced from the track 59 and which extends from adjacent the feed trough 83 to adjacent the end of the frame, located remote therefrom. A tray or pan 103 has an elevated inner longitudinal edge which is supported on the shelf 102, beneath the track 59, and said pan adjacent its outer longitudinal edge is provided with a plurality of depending adjustable legs 104 which cooperate with the shelf 102 for supporting the tray 103 at an incline downwardly and outwardly from said shelf. The tray has upstanding walls 105 at its outer edge and ends and may be provided with a cushioning strip 106 to line the upper surface of the bottom thereof. Said tray 103 is separated into a plurality of compartments which extend crosswise thereof by elastic divided elements 107, complementary ends of which are secured by fastenings 108 to the upper side of the tray bottom beneath the track 59. The dividers 107 have hooks 109 at their opposite ends which selectively engage openings formed in the wall 105 which is disposed parallel to the track 59, and which wall may be provided with a plurality of openings spaced therealong to selectively receive the hooks 109 to vary the size and capacity of the different compartments 111 formed thereby, one of such openings 110 being shown in Figure 14. It will be obvious that the elastic dividers 107 can be stretched so that the hooks 109 thereof can be positioned to engage selected openings 110 and that the hooks will be retained in engagement therewith by the elasticity of said dividers. As seen in Figure 1, the compartments 111 are of a number corresponding to the number of grading stations, each of which grading stations has a compartment disposed in alignment therewith.

Articles to be sorted or graded by weight, such as eggs 112, are placed on the tube covered rods 92 from end-to-end of the trough 83. One of said eggs or articles 112 will roll partially over the flattened tube ends 97 onto the track section 60 and said egg or article will provide a stop to keep the remaining eggs from rolling down the rods toward the track section 60. As best seen in Figure 13, the outer edge of the track section 60 is provided with an arcuate recess 113, between the tube ends 97 over which the eggs 112 can readily pass. It will also be readily apparent that the light source 98 can be illuminated so that an operator of the machine standing to the right of the trough 83, as seen in Figure 1, can candle the eggs while the eggs are supported on the rods 92 above said light source.

The motor 27, which is preferably an electric motor, is driven for driving the shaft 32 and crank 35 in either direction. Assuming that the crank 35 is turning counter-clockwise as viewed from the front of the machine, in Figure 1, said crank is shown after it has passed its outer-most horizontal position and has commenced to swing upwardly and inwardly relative to the machine, so that the pusher units 56, 57 have commenced their travel from right to left of Figure 1. During such travel, the pusher units 56, 57 are disposed directly above and adjacent the track 59, as illustrated in Figures 3 and 9 and in full lines in Figure 2. The distance of travel of each push unit 56, 57 is approximately equal to the length of one track section 61 and one track section 63. Accordingly, an egg which has assumed a position, as previously described, on the track section 60 will be conveyed by the right hand most pusher or propelling unit 56, 57 from right to left onto the first track section 63 which forms a part of the grading station 64. The other pusher units 56, 57, in a like manner, will slidably move eggs which are located on the different track sections 63 to the next track section 63, so that the grading devices 64—69 constitute successive dwell positions for the eggs 112, the majority of which however do not travel to the last grading station 69. During this movement of the propelling units 56, 57 from right to left of Figure 1, the rod end 42a is travelling from right to left of Figure 11 from beyond the upper end of the rear rail 50 to beyond the forward end of the front rail 47, and in so moving travels between the top rail 45 and the top bar 46. Said top bar 46 prevents the cushioning elements 57 from being displaced downwardly sufficiently to contact the track 59. As the rod end 42a approaches the extremity of its right to left movement of Figure 11 it will strike the upper free end of the front rail 47 and will flex said end downwardly as seen in dotted lines in Figure 11, so as to enable the rod end 42a to pass between the forward end of the front rail 47 and the top bar 46, after which the front rail 47 will spring back to its full line position of Figure 11. Accordingly, when the crank 35 thereafter commences its movement from left to right of Figure 1, the shaft 37 and the rod 42 will move in the same direction and the rod end 42a in moving from left to right as seen in Figure 11, will strike the underside of the front cam rail 47 and in moving down said cam rail 47 will cause the shaft 37 to turn clockwise as seen in Figure 2 to elevate the propelling elements to approximately their positions as seen in dotted lines in Figure 2. While the rod end 42a is travelling along the underside of the rails 47 and 49, the propelling elements 56, 57 will be moved from left to right of Figure 1 and while being held in elevated positions so as to pass over an egg 112 which might be disposed behind each individual propelling element. Thereafter, the rod end 42a will move up the inclined rear track 50 back into engagement with the underside of the bar 46, allowing the propelling elements to resume their lowered full line positions of Figure 2 as said elements complete their travel from left to right of Figure 1, preparatory to repeating the step-by-step advancement of the eggs from right to left along the track 59. A counterweight 114 is mounted on the rod 42 between the shaft 37 and rod end 42a to counterbalance the weight of the bar 52 and parts supported thereby sufficiently so that the propelling elements will not be swung forcibly down toward the track 59 by the weight thereof.

Each time that the propelling elements swing upwardly, the eggs which are then in dwell positions on the track sections 63 and which are of sufficient weight to overcome the adjustable weights 79 of said grading stations, will cause the weighing devices thereof to be rocked so that the track sections or scale pan portions 63 will swing downwardly to allow the eggs 112 to roll off of the outer edges thereof into the tray compartments 111 which align with said grading stations, as illustrated in Figure 1. It will be apparent that this downward swinging movement of the pan portions 63 to discharging positions will be gradual as it can occur only as the bar 52 is swinging upwardly away from the pan portions 71, so that the eggs will be very gently released to roll into the compartments 111. It will be noted that the track 59 is slightly trough shaped in cross section to effectively prevent the eggs from rolling from the track, except when supported on a tilting track section 63. The eggs can roll onto the track section 60 with either end foremost since the concave front faces 57a of the cushioning members 57 can engage either end of an egg.

It will also be apparent that the track 59 may be of other cross sectional shapes where the machine is to be used in grading other types of articles and the outer or right-hand end of the track section 60 may be provided with a stop 115 to prevent spherical articles being graded from rolling to the right, past a position to be engaged by the right-hand-most propelling element 56, 57.

Various modifications and changes are contemplated and may obviously be resorted to, without departing from the spirit or scope of the invention as hereinafter defined by the appended claims.

I claim as my invention:

1. A machine for grading articles by weight comprising an elongated frame, an elongated track supported by said frame, a plurality of propelling elements, means carried by said frame and supporting said propelling elements in spaced apart relation to one another above said track, means for imparting a reciprocating movement to said supporting means and the propelling elements, cam means cooperating with said last mentioned means for imparting a rocking movement to the propelling elements whereby said propelling elements are caused to move in one direction in close proximity to an upper surface of the track for propelling articles to be graded therealong and to be swung upwardly and thereafter downwardly in the return movement thereof in the opposite direction for passing over articles disposed behind the propelling elements, for advancing said articles along the track in a step-by-step movement, said track including a plurality of tiltable track sections forming portions of weighing stations of the machine and disposed at the dwell positions of the articles conveyed along the track by said propelling elements, each of said tiltable track sections constituting a portion of a scale pan forming a part of a weighing scale, said weighing scales having adjustable weights arranged to permit the tiltable track sections to be tilted by progressively decreasing weights for sorting the articles by weight during their travel along the track, said supporting means including an elongated element disposed in sliding contact with a portion of each of the weighing scales, while said propelling elements are moving in a direction for propelling articles along said track, to prevent downward tilting movement of the tiltable track sections during movement of said elements in an article propelling direction, said elongated element being swingable upwardly with the propelling elements on the return movement thereof to release the weighing scales.

2. A machine as in claim 1, said tiltable track sections having stops projecting from the ends thereof and engaging under other stationary sections of the track and cooperating with the adjustable weights for normally maintaining the tiltable track sections coplanar with the remainder of the track.

3. A machine for grading articles by weight comprising an elongated frame, an elongated track supported by said frame, a plurality of propelling elements, means carried by said frame and supporting said propelling elements in spaced apart relation to one another above said track, means for imparting a reciprocating movement to said supporting means and the propelling elements, cam means cooperating with said last mentioned means for imparting a rocking movement to the propelling elements whereby said propelling elements are caused to move in one direction in close proximity to an upper surface of the track for propelling articles to be graded therealong and to be swung upwardly and thereafter downwardly in the return movement thereof in the opposite direction for passing over articles disposed behind the propelling elements, for advancing said articles along the track in a step-by-step movement, said track including a plurality of tiltable track sections forming portions of weighing stations of the machine and disposed at the dwell positions of the articles conveyed along the track by said propelling elements, each of said tiltable track sections constituting a portion of a scale pan forming a part of a weighing scale, said weighing scales having adjustable weights arranged to permit the tiltable track sections to be tilted by progressively decreasing weights for sorting the articles by weight during their travel along the track, said cam means including a stationary cam rail, an element connected to said supporting means and having a part disposed to engage and travel around said cam rail and which is disposed in laterally spaced relation to the axis about which said supporting means oscillates.

4. A machine as in claim 3, said cam rail including a resilient part forming a switch for effecting a change in the direction of travel of said rail engaging part to effect the upward swinging movement of the propelling elements on the return travel thereof.

5. A machine for grading articles by weight comprising an elongated frame, an elongated track supported by said frame, a plurality of propelling elements, means carried by said frame and supporting said propelling elements in spaced apart relation to one another above said track, means for imparting a reciprocating movement to said supporting means and the propelling elements, cam means cooperating with said last mentioned means for imparting a rocking movement to the propelling elements whereby said propelling elements are caused to move in one direction in close proximity to an upper surface of the track for propelling articles to be graded therealong and to be swung upwardly and thereafter downwardly in the return movement thereof in the opposite direction for passing over articles disposed behind the propelling elements, for advancing said articles along the track in a step-by-step movement, said track including a plurality of tiltable track sections forming portions of weighing stations of the machine and disposed at the dwell positions of the articles conveyed along the track by said propelling elements, each of said tiltable track sections constituting a portion of a scale pan forming a part of a weighing scale, said weighing scales having adjustable weights arranged to permit the tiltable track sections to be tilted by progressively decreasing weights for sorting the articles by weight during their travel along the track, said track being trough-shaped and of a width whereby the articles, constituting eggs, are retained in positions lengthwise thereof to be slid along the track by the propelling elements, and a feeder unit supported at an incline on said frame and crosswise of the track for feeding articles by gravity to a starting section of the track.

6. A machine for grading articles by weight comprising an elongated frame, an elongated track supported by said frame, a plurality of propelling elements, means carried by said frame and supporting said propelling elements in spaced apart relation to one another above said track, means for imparting a reciprocating movement to said supporting means and the propelling elements, cam means cooperating with said last mentioned means for imparting a rocking movement to the propelling elements whereby said propelling elements are caused to move in one direction in close proximity to an upper surface of the track for propelling articles to be graded therealong and to be swung upwardly and thereafter downwardly in the return movement thereof in the opposite direction for passing over articles disposed behind the propelling elements, for advancing said articles along the track in a step-by-step movement, said track including a plurality of tiltable track sections forming portions of weighing stations of the machine and disposed at the dwell positions of the articles conveyed along the track by said propelling elements, each of said tiltable track sections constituting a portion of a scale pan forming a part of a weighing scale, said weighing scales having adjustable weights arranged to permit the tiltable track sections to be tilted by progressively decreasing weights for sorting the articles by weight during their travel along the track, said supporting means including a shaft supported for reciprocating and oscillating movement and a bar supported in laterally spaced substantially parallel relation to the shaft, said propelling elements being supported by said bar and said bar being disposed between the shaft and said propelling elements.

7. A machine as in claim 6, and said shaft being disposed between said bar and said cam means.

8. A machine as in claim 7, said cam means including a fixed cam defining a cam path to effect a rocking movement of said propelling elements, and a member fixed to and projecting laterally from said shaft and having a portion disposed to travel in a complete circuit around said cam path during each cycle of movement of said shaft and propelling elements.

9. A machine for grading by weight of elongated articles of substantially circular cross section comprising, a frame, an elongated track of trough-shaped cross section supported by said frame, a plurality of propelling elements, means carried by said frame and supporting said propelling elements in spaced apart relation to one another above the track, means imparting a reciprocating movement to said supporting means and the propelling elements, cam means cooperating with said last mentioned means for imparting a rocking movement to the propelling elements whereby said propelling elements are caused to move in one direction in close proximity to an upper concave surface of the track for propelling articles to be graded therealong and to be swung upwardly and thereafter downwardly in the return movement thereof in the opposite direction for passing over articles disposed behind the propelling elements, for advancing said articles along the track in a step-by-step movement, said track being of a width relative to the length of the articles such that the articles are retained by the track in positions lengthwise of the track for sliding movement along the track, said track including a plurality of tiltable track sections forming portions of weighing stations of the machine and disposed at dwell positions of the articles conveyed along the track by said propelling elements, each of said tiltable track sections constituting a portion of a scale pan forming a part of a weighing scale, and said weighing scales having counterweights constructed and arranged to permit the tiltable track sections to be tilted by progressively decreasing weights for sorting the articles by weight during their travel along the track, the articles being adapted to roll laterally from tilted track sections.

10. A machine as in claim 9, each of said propelling elements including a concave article engaging face adapted to engage an end of the article being conveyed thereby during movement of the propelling elements in a direction for conveying the articles.

References Cited in the file of this patent

UNITED STATES PATENTS

| | | |
|---|---|---|
| 1,875,811 | Hilgers | Sept. 6, 1932 |
| 1,899,179 | Beutel et al. | Feb. 28, 1933 |
| 2,433,575 | Niederer | Dec. 30, 1947 |
| 2,681,136 | Ipsen | June 15, 1954 |

FOREIGN PATENTS

| | | |
|---|---|---|
| 132,200 | Australia | Apr. 19, 1949 |
| 335,951 | Great Britain | Oct. 6, 1930 |